United States Patent
Yoshioka

(10) Patent No.: US 6,909,926 B2
(45) Date of Patent: Jun. 21, 2005

(54) PRODUCTION CONTROL METHOD AND A COMPUTER PROGRAM THEREFOR

(75) Inventor: Kenichi Yoshioka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 97 days.

(21) Appl. No.: 10/193,171

(22) Filed: Jul. 12, 2002

(65) Prior Publication Data

US 2003/0163215 A1 Aug. 28, 2003

(30) Foreign Application Priority Data

Feb. 28, 2002 (JP) .................................. 2002-053996

(51) Int. Cl.[7] .............................................. G06F 19/00
(52) U.S. Cl. ...................... 700/108; 700/109; 700/110
(58) Field of Search ................... 700/108, 109, 700/110, 98, 117; 709/201; 714/37, 38; 717/101, 102, 103, 120, 121, 154

(56) References Cited

U.S. PATENT DOCUMENTS

| | | | |
|---|---|---|---|
| 6,314,328 B1 | * | 11/2001 | Powell ........................ 700/80 |
| 2003/0109945 A1 | * | 6/2003 | Cho et al. ..................... 700/95 |
| 2003/0115575 A1 | * | 6/2003 | Reyna ........................ 717/120 |
| 2004/0064805 A1 | * | 4/2004 | Sparago et al. ............. 717/120 |

* cited by examiner

*Primary Examiner*—Leo Picard
*Assistant Examiner*—Carlos Ortiz-Rodriguez
(74) *Attorney, Agent, or Firm*—Staas & Halsey LLP

(57) ABSTRACT

A production control method manages the development progress of a plurality of products transmitted from production terminals of a plurality of producers, by analyzing components of the products based on standard values, and evaluating the progress in producing the products.

16 Claims, 27 Drawing Sheets

| DEVELOPER | PROCESS | ANALYSIS POINT | COMMENT RATIO | EXECUTION STEP RATIO | DATA DEFINITION RATIO | FUNCTION USAGE RATIO | ALARM CONTENT |
|---|---|---|---|---|---|---|---|
| | | TOLERANCE OF DB READ IN PROCESS | 10~30% | 50~90% | 0~20% | 5~15% | |
| OKAWA | DB READ IN | | 5% | 78% | 17% | 5.8% | NG TOO FEW COMMENTS |

FIG.6

| SITE | COMPANY | DEVELOPER | PROGRAM | SIZE | PRODUCTIVITY | NUMBER OF PROGRAMS |
|---|---|---|---|---|---|---|
| KAWASAKI | A | YAMADA | SCREEN INPUT | 4K | 2K/MONTH | 1 |
| OIMACHI | B | OKAWA | DB READ IN | 6K | 1.5K/MONTH | 2 |
| KAMATA | C | KATO | INFORMATION SEARCH | 3K | 3K/MONTH | 2 |
| ... | ... | ... | ... | ... | ... | ... |

| PROGRAM | SCHEDULED STARTING DATE | SCHEDULED FINISHING DATE |
|---|---|---|
| SCREEN INPUT | 2001. 8. 1 | 2001. 9. 30 |
| DB READ IN | 2001. 8. 1 | 2001. 11. 30 |
| . . . | . . . | . . . |

FIG.8

| PROGRAM | COMMENT RATIO | EXECUTION STEP RATIO | DATA DEFINITION RATIO | FUNCTION USAGE RATIO TO EXECUTION STEPS |
|---|---|---|---|---|
| SCREEN INPUT | 20% | 60% | 20% | 5% |
| DB READ IN | 20% | 70% | 10% | 10% |
| ... | ... | ... | ... | ... |

| ALLOWANCE | COMMENT RATIO | EXECUTION STEP RATIO | DATA DEFINITION RATIO | FUNCTION USAGE RATIO |
|---|---|---|---|---|
| | ±10% | ±20% | ±10% | ±5% |

| PROGRAM | COMMENT SIZE | EXECUTION STEP SIZE | DATA DEFINITION SIZE | NUMBER OF FUNCTIONS USED | COMPONENT EVALUATION |
|---|---|---|---|---|---|
| SCREEN INPUT | 0.4 k | 1.3 k | 0.3 k | 100 | OK |
| DB READ IN | 0.3 k | 4.7 k | 1 k | 300 | NG TOO FEW COMMENTS |
| ... | ... | ... | ... | ... | ... |

FIG.12

| PROGRAM | ACTUAL STARTING DATE | UPLOADING DATE | SIZE | PROGRESS EVALUATION |
|---|---|---|---|---|
| SCREEN INPUT | 2001.9.1 | 2001.9.30 | 2k | -4 |
| DB READ IN | 2001.8.1 | 2001.9.30 | 6k | +8 |
| ... | ... | ... | ... | ... |

| DEVELOPER | NUMBER OF PROGRAMS | PROGRAM SIZE | COMPANY | PROGRESS EVALUATION AVERAGE | NUMBER OF DELAYING PROGRAMS | PROGRESS EVALUATION AVERAGE OF DELAYING PROGRAMS |
|---|---|---|---|---|---|---|
| YAMADA | 1 | 4 k | A | −4 | 1 | −4 |
| OKAWA | 2 | 10 k | B | 0 | 0 | 0 |
| KATO | 2 | 5 k | C | −2.5 | 1 | −5 |
| . | . | . | . | . | . | . |

| SITE | NUMBER OF PROGRAMS | PROGRAM SIZE | NUMBER OF DEVELOPERS | PROGRESS EVALUATION AVERAGE | NUMBER OF DELAYING PROGRAMS | PROGRESS EVALUATION AVERAGE OF DELAYING PROGRAMS |
|---|---|---|---|---|---|---|
| KAWASAKI | 10 | 100k | 20 | −0.5 | 2 | −3 |
| OIMACHI | 20 | 200k | 40 | 1 | 0 | 0 |
| KAMATA | 5 | 10k | 3 | −3 | 2 | −3 |
| · | | | | · | · | · |

| COMPANY | NUMBER OF PROGRAMS | PROGRAM SIZE | NUMBER OF DEVELOPERS | PROGRESS EVALUATION AVERAGE | NUMBER OF DELAYING PROGRAMS | PROGRESS EVALUATION AVERAGE OF DELAYING PROGRAMS |
|---|---|---|---|---|---|---|
| A | 8 | 40k | 4 | 1 | 0 | 0 |
| B | 16 | 160k | 38 | 1 | 0 | 0 |
| C | 11 | 110k | 21 | −2.5 | 4 | −6 |
| · | · | · | · | · | · | · |

| DEVELOPER | PROCESS | ANALYSIS POINT | COMMENT RATIO | EXECUTION STEP RATIO | DATA DEFINITION RATIO | FUNCTION USAGE RATIO | ALARM CONTENT |
|---|---|---|---|---|---|---|---|
| | | | 10~30% | 50~90% | 0~20% | 5~15% | |
| OKAWA | DB READ IN | TOLERANCE OF DB READ IN PROCESS | 5% | 78% | 17% | 5.8% | NG TOO FEW COMMENTS |

| SITE | COMPANY | PERSON IN CHARGE | DESIGN SPECIFICATION | SCHEDULED SIZE | SCHEDULED PRODUCTIVITY |
|---|---|---|---|---|---|
| KAWASAKI | A | YAMADA | SCREEN INPUT | 200 | 100/MONTH |
| OIMACHI | B | OKAWA | DB READ IN | 300 | 75/MONTH |
| . . . | . . . | . . . | . . . | . . . | . . . |

FIG.18

| DESIGN SPECIFICATION | SCHEDULED STARTING DATE | SCHEDULED COMPLETION DATE |
|---|---|---|
| SCREEN INPUT | 2 0 0 1. 8. 1 | 2 0 0 1. 9. 3 0 |
| DB READ IN | 2 0 0 1. 8. 1 | 2 0 0 1. 11. 3 0 |
| . . . | . . . | . . . |

| DESIGN SPECIFICATION | PRINTING AREA | AVERAGE CHARACTER RATIO | DRAWING RATIO | FULL-PAGE DRAWING RATIO |
|---|---|---|---|---|
| SCREEN INPUT | 800 CHARACTERS | 50% | 50% | 10% |
| DB READ IN | 400 CHARACTERS | 40% | 60% | 20% |
| ... | ... | ... | ... | ... |

FIG.20

|  | AVERAGE CHARACTER RATIO | AVERAGE CHARACTER RATIO | AVERAGE CHARACTER RATIO |
|---|---|---|---|
| ALLOWANCE | ±20% | ±20% | ±10% |

| DESIGN SPECIFICATION | NUMBER OF CHARACTERS | NUMBER OF PAGES CONTAINING DRAWING | NUMBER OF FULL-PAGE DRAWINGS | COMPONENT EVALUATION |
|---|---|---|---|---|
| SCREEN INPUT | 12,340 | 100 | 20 | OK |
| DB READ IN | 21,678 | 120 | 60 | NG TOO FEW DRAWINGS |
| ... | ... | ... | ... | ... |

| DESIGN SPECIFICATION | ACTUAL STARTING DATE | UPLOADING DATE | SIZE | PROGRESS EVALUATION |
|---|---|---|---|---|
| SCREEN INPUT | 2001. 9. 1 | 2001. 9. 30 | 100 | -4 |
| DB READ IN | 2001. 8. 1 | 2001. 9. 30 | 300 | +8 |
| ... | ... | ... | ... | ... |

FIG.24

| PERSON IN CHARGE | NUMBER OF DESIGN SPECIFICATIONS | SCHEDULED NUMBER OF SHEETS | COMPANY | PROGRESS EVALUATION AVERAGE | NUMBER OF DELAYING DESIGN SPECIFICATIONS | PROGRESS EVALUATION AVERAGE OF DELAYING DESIGN SPECIFICATIONS |
|---|---|---|---|---|---|---|
| YAMADA | 1 | 200 | A | -4 | 1 | -4 |
| OKAWA | 2 | 1,000 | B | 0 | 0 | 0 |
| KATO | 2 | 500 | C | -2.5 | 1 | -5 |
| . | . | . | . | . | . | . |

| SITE | NUMBER OF DESIGN SPECIFICATIONS | SCHEDULED NUMBER OF SHEETS | NUMBER OF DESIGNERS | PROGRESS EVALUATION AVERAGE | NUMBER OF DELAYING DESIGN SPECIFICATIONS | PROGRESS EVALUATION AVERAGE OF DELAYING DESIGN SPECIFICATIONS |
|---|---|---|---|---|---|---|
| KAWASAKI | 10 | 50,000 | 20 | -0.5 | 2 | -3 |
| OIMACHI | 20 | 10,000 | 40 | 1 | 0 | 0 |
| KAMATA | 5 | 2,000 | 3 | -3 | 2 | -3 |
| . | | . | | . | | . |

| COMPANY | NUMBER OF DESIGN SPECIFICATIONS | SCHEDULED NUMBER OF SHEETS | NUMBER OF DESIGNERS | PROGRESS EVALUATION AVERAGE | NUMBER OF DELAYING DESIGN SPECIFICATIONS | PROGRESS EVALUATION AVERAGE OF DELAYING DESIGN SPECIFICATIONS |
|---|---|---|---|---|---|---|
| A | 8 | 4,000 | 4 | 1 | 0 | 0 |
| B | 16 | 8,000 | 38 | 1 | 0 | 0 |
| C | 11 | 5,000 | 21 | -2.5 | 4 | -6 |
| . | . | . | . | . | . | . |

| DESIGNER | PROCESS | ANALYSIS POINT | AVERAGE CHARACTER RATIO | DRAWING RATIO | FULL-PAGE DRAWING RATIO | ALARM CONTENT |
|---|---|---|---|---|---|---|
| | | | 20~60% | 40~80% | 10~30% | |
| OKAWA | DB READ IN | TOLERANCE OF DB READ IN PROCESS | 85% | 45% | 5.8% | NG TOO FEW DRAWINGS |

234

PRODUCTION CONTROL METHOD AND A COMPUTER PROGRAM THEREFOR

BACKGROUND OF THE INVENTION

1. Field of the Invention

The present invention generally relates to a production control method, and specifically relates to a production control method for managing development of a product (production information) developed at two or more development sites, when developing software and the like.

The present invention also relates to a computer program that enables a computer to perform processing of the production control method.

2. Description of the Related Art

When developing large-scale software, a project manager at a central development site usually segments the software into sections, and distributes the sections of the software to a plurality of developers who are situated externally, and manages the whole of the production information that is a plurality of programs developed by the plurality of developers. Often, a large number of development sites are involved, with a large number of layers of the development.

Further, software development at the central development site is influenced by progress situations of the external development sites. Further, when software for program generation differs from site to site, adjustments of production information (software products) from each site are required in order to achieve consistency of the production information (software products) developed at the development sites, such that a consistent package is completed. For this reason, it has been difficult to manage the development of production information in a consistent manner. In order to solve such a problem, conventionally, there has been a technique of transmitting source information and module information extracted for purposes of managing the progress of software production at the development sites to a project manager, such as revealed in Japanese Patent 2001-92650.

However, in the above-mentioned conventional technology, managers of the external development sites have had to extract the source information and the module information from programs under development, and transmit them to the central manager, causing a problem of taking additional time and effort.

Further, since the manager at the central development site manages development progress only by the source information and the module information, without acquiring the programs developed by the external development sites, the exact development progress situation cannot be ascertained. Further, since a developer at the central site cannot acquire the program developed at the external development sites, the problem is that a program development cannot be started, or even prepared, at the central site.

Since the central development site does not acquire the program, the central site cannot take positive action when an error occurs in the program.

SUMMARY OF THE INVENTION

It is a general object of the present invention to provide a production control method, and a computer program that performs the control method that substantially obviate one or more of the problems caused by the limitations and disadvantages of the related art.

Features and advantages of the present invention will be set forth in the description that follows, and in part will become apparent from the description and the accompanying drawings, or may be learned by practice of the invention according to the teachings provided in the description. Objects as well as other features and advantages of the present invention will be realized and attained by a method and a computer program particularly pointed out in the specification in such full, clear, concise, and exact terms as to enable a person having ordinary skill in the art to practice the invention.

To achieve these and other advantages and in accordance with the purpose of the invention, as embodied and broadly described herein, the invention provides a production method and a computer program that realize efficient management of production information (software product) by grasping the exact progress situation based on the production information acquired, and transmitting the information to local and central development site managers.

In order to attain the above-mentioned objective, the production control method of the present invention includes a component standard value management process that manages a standard value of each of the components of a product to be developed, and a component evaluation process that evaluates progress on each of the components in comparison with the standard value.

In this manner, the production control method of the present invention enables the project manager to grasp properties of the product by evaluating the components that constitute the product.

The production control method of the present invention also includes a progress evaluation process that evaluates the progress situation of the product according to attributes of each component of the product.

In this manner, the progress situation can be grasped by attributes of each of the components of the product.

The present invention also includes a display process that displays results of the component evaluation process and the progress evaluation process on at least one of a terminal on a local development site and a terminal on the central management site.

In this manner, the results of the component evaluation process and the progress evaluation process are displayed, such that development management is facilitated.

Furthermore, the present invention also includes a communication process that transmits a predetermined message, when results of the component evaluation process and the progress evaluation process match with predetermined conditions.

In this manner, the progress situation of a transmitting party can be communicated to a receiving party that is typically the central development site, and any other parties that need to grasp the progress situation.

Further, the production control method of the present invention provides a checking process by which the evaluation results of the component evaluation process and the progress evaluation process are checked in reference to predetermined values, and an output process by which alarm information is output based on the checking results of the checking process.

In this manner, if there is a delay, an alarm is transmitted.

Furthermore, the production control method of the present invention includes a search process by which a product containing an error is searched when an error occurs while running a plurality of software products, and an error processing process that is performed based on a result of the search process.

In this manner, a component that contains an error can be identified, and corrected promptly.

Further, the present invention includes a computer program that performs the above-mentioned production control, and a recording medium that contains the computer program.

BRIEF DESCRIPTION OF THE DRAWINGS

FIG. 6 shows a table stored in a component standard information DB of the first embodiment of the present invention;

FIG. 7 shows a table stored in the component standard information DB of the first embodiment of the present invention;

FIG. 8 shows a table stored in the component standard information DB of the first embodiment of the present invention;

FIG. 9 shows a table stored in the component standard information DB of the first embodiment of the present invention;

FIG. 11 shows a table stored in a production information DB of the first embodiment of the present invention;

FIG. 12 shows a table stored in the production information DB of the first embodiment of the present invention;

FIG. 13 shows a table stored in an evaluation result DB of a production control server of the first embodiment of the present invention;

FIG. 14 shows a table stored in the evaluation result DB of the production control server of the first embodiment of the present invention;

FIG. 15 shows a table stored in the evaluation result DB of the production control server of the first embodiment of the present invention;

FIG. 16 shows an example of a screen display of the evaluation result of the first embodiment of the present invention;

FIG. 17 shows a table stored in the component standard information DB of a second embodiment of the present invention;

FIG. 18 shows a table stored in the component standard information DB of the second embodiment of the present invention;

FIG. 19 shows a table stored in the component standard information DB of the second embodiment of the present invention;

FIG. 20 shows a table stored in the component standard information DB of the second embodiment of the present invention;

FIG. 22 shows a table stored in the production information DB of the second embodiment of the present invention;

FIG. 23 shows a table stored in the production information DB of the second embodiment of the present invention;

FIG. 24 shows a table stored in the evaluation result DB of the production control server of the second embodiment of the present invention;

FIG. 25 shows a table stored in the evaluation result DB of the production control server of the second embodiment of the present invention;

FIG. 26 shows a table stored in the evaluation result DB of the production control server of the second embodiment of the present invention; and FIG. 27 shows an example of a screen display of the evaluation result of the second embodiment of the present invention.

DESCRIPTION OF THE PREFERRED EMBODIMENTS

In the following, embodiments of the present invention will be described with reference to the accompanying drawings.

Figure 1:
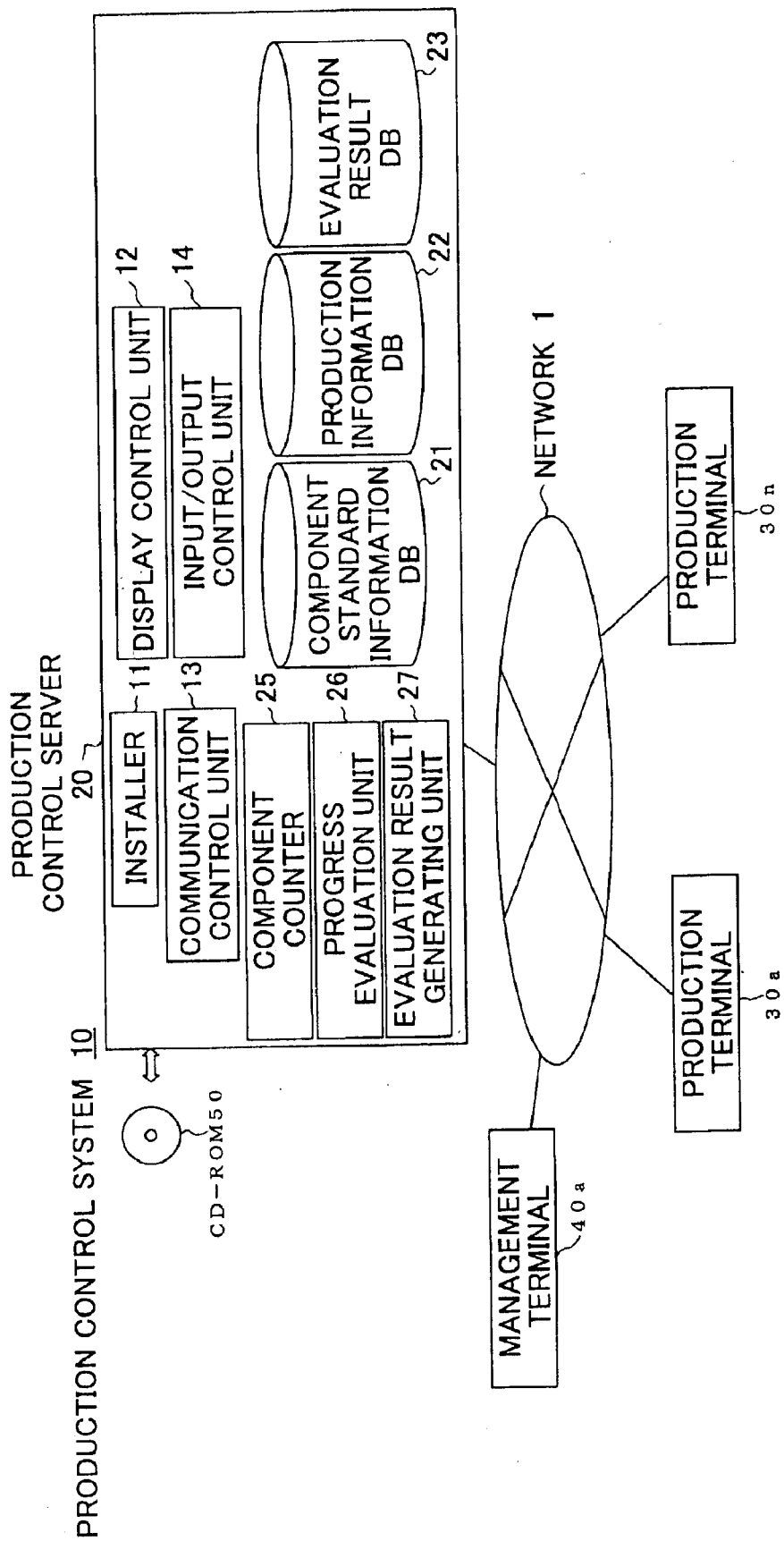
FIG. 1 shows a system configuration of a production control method of a first embodiment of the present invention.

FIG. 1 shows a system configuration of a production control method of an embodiment of the present invention. In FIG. 1, a production control system 10 in the production control method includes a production control server 20 for managing production of a program etc., production terminals 30a through 30n provided at external development sites and owned by external developers, and a management terminal 40a provided at a central development site owned by a manger who manages production control of the program, etc.

In reference to FIG. 1, the production control server 20, the production terminals 30a through 30n, and the management terminal 40a are server computers that are controlled by CPUs. The CPU processes the production control method according to a program stored in a memory unit. A network 1 connects the production control server 20, the production terminals 30a through 30n and the management terminal 40a.

The production control server 20 includes an installer 11 that installs a program mainly for production control processing, a display control unit 12 that controls display of data, a communication control unit 13 that controls data communication, an input/output control unit 14 that controls input/output of data, a component counter 25 that counts components of a program, a progress evaluation unit 26 that evaluates the progress situation of a program production, an evaluation result generating unit 27 that generates an evaluation result according to identification and attributes of production tasks, such as names of development sites, names of development companies, and names of developing individuals, based on the progress situation of the program production, a component standard information data base (DB) 21 that stores component standard information, a production information DB 22 that stores production information (software products), and an evaluation result DB 23 that stores the evaluation result generated by the evaluation result generating unit 27.

The display control unit 12 includes a display unit, such as a display, and controls display data in order to display the data on the display unit. The communication control unit 13 controls transmission and reception of data through the network 1, and includes a communication unit for connecting with the network. The input/output control unit 14 controls input devices, such as a mouse and a keyboard, and output devices, such as a printer, and controls input/output of data. The installer 11 reads a program from a CD-ROM 50 in which a program for realizing the production control method of the present invention is stored, and installs the read program in secondary storage, etc. When the processing of the production control method described later is started, according to the program installed in secondary storage, the CPU will start the processing. Here, a recording medium in which the program is stored does not have to be a CD-ROM, but any recording medium that a computer can read is applicable.

The component counter 25 counts the number of components of the program supplied from the production terminals 30a through 30n. The progress evaluation unit 26 generates evaluation information on the progress situation of the program for which the component count processing has been carried out, and stores the count result and evaluation information in the component standard information DB 21 and the production information DB 22. Based on the information stored in the component standard information DB 21 and the production information DB 22, the evaluation result generating unit 27 generates an evaluation result according to identification and attributes, and stores the result in the evaluation result DB 23. FIGS. 6 through 9 show tables stored in the component standard information DB 21, FIG. 11 and FIG. 12 show tables stored in the production information DB 22, and FIGS. 13 through 16 show tables stored in the evaluation result DB 23.

Further, each of the production terminals 30a through 30n, and the management terminal 40a includes a display control unit, a communication control unit and an input/output control unit that are similar to the display control unit 12, the communication control unit 13, and the input/output control unit 14, respectively, of the production control server 20. Therefore, explanations of these items are not repeated. Here, the production control system 10 can be adapted when there are a plurality of management terminals 40a.

A program is developed using the production terminals 30a through 30n, according to a program production request transmitted from the production control server 20. The program developed is transmitted to the production control server 20 from the production terminals 30a through 30n at a predetermined time. Further, the evaluation result generated based on progress evaluation information for every developing company and every developing individual is transmitted from the production control server 20 to the production terminals 30a through 30n.

The management terminal 40a receives the progress evaluation information on the programs developed using the production terminals 30a through 30n, and the evaluation result of every development company and every developing individual, which are transmitted by the production control server 20. Here, the management terminal 40a and the production control server 20 may be situated together.

Figure 2:
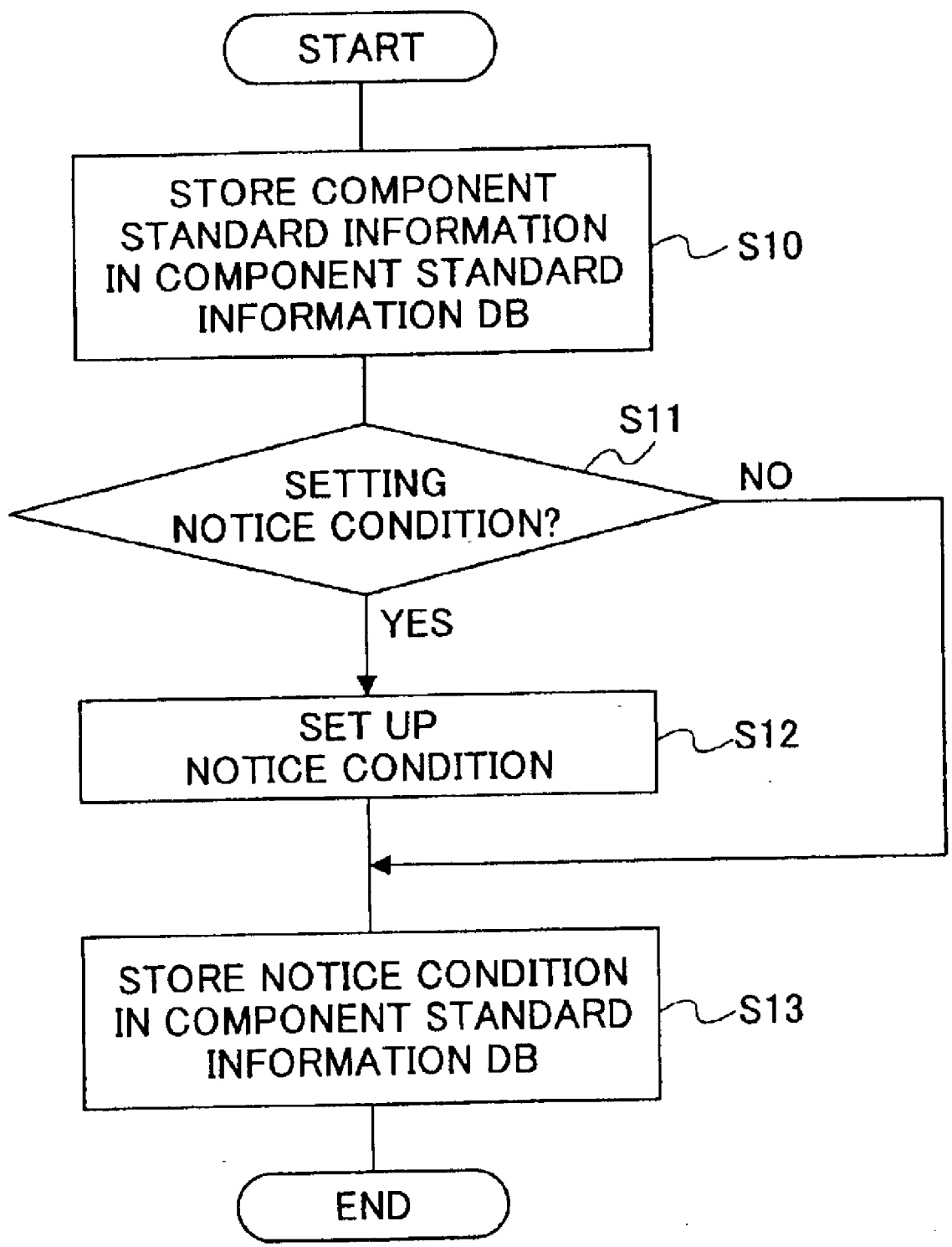
FIG. 2 is a flowchart for explaining a process of the production control of the first embodiment of the present invention.

Next, the process of the production control method is explained. FIG. 2 is a flowchart for explaining a production control process of the first embodiment of the present invention. Specifically, FIG. 2 shows a process that sets up the component standard information and a notice condition concerning the production control processing. First, the component standard information transmitted from the production terminals 30a through 30n and the management terminal 40a is stored in the component standard information DB 21 by the process shown in step S10. Details of the component standard information will be described using FIGS. 6 through 9. Next, at step S11, it is determined whether a notice condition of a message about the progress evaluation result is set up. If a notice condition is to be set up at step S11, a notice condition setting up screen is transmitted from the production control server 20 at step S12, such that the screen is displayed on the production terminals 30a through 30n, and a notice condition is input according to the notice condition setting screen. At step S13, the notice condition is stored in the component standard information DB 21. Here, the notice condition setting up shown in step S12 can also be performed by the management terminal 40a.

Figure 3:
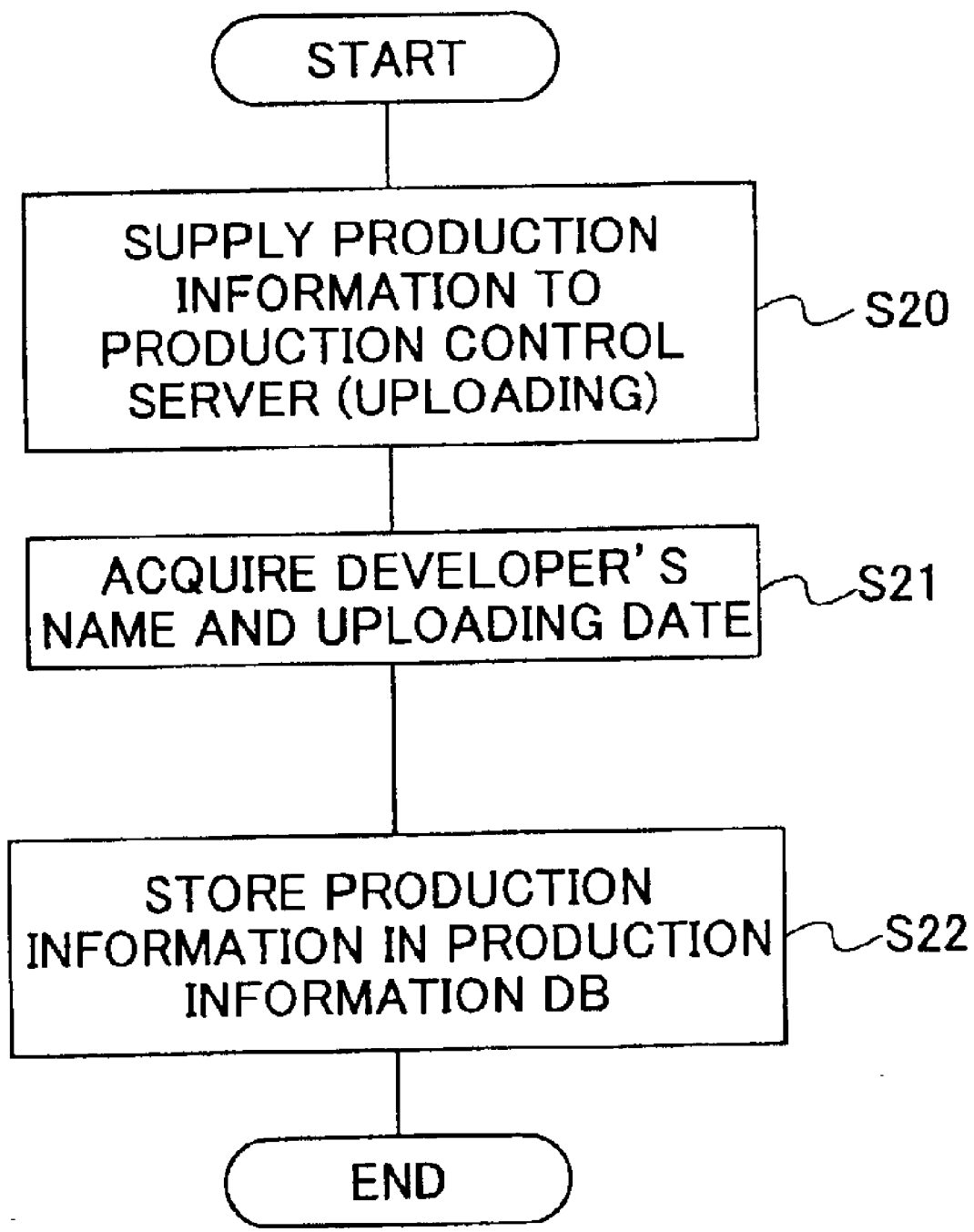
FIG. 3 is a flowchart for explaining the production control process of the first embodiment of the present invention.

Next, a process that stores the production information (a software product) of the production control process is explained. FIG. 3 is a flowchart for explaining the production control processing of the first embodiment of the present invention. In reference to FIG. 3, at step S20, the production information (a software product) developed using the production terminals 30a through 30n is supplied to the production control server 20 (uploading). At step S21, the name of the developing individual and the uploading date of the supplied production information are acquired. At step S22, production information, the name of the developing individual and the uploading date are stored in the production information DB 22.

Figure 4:
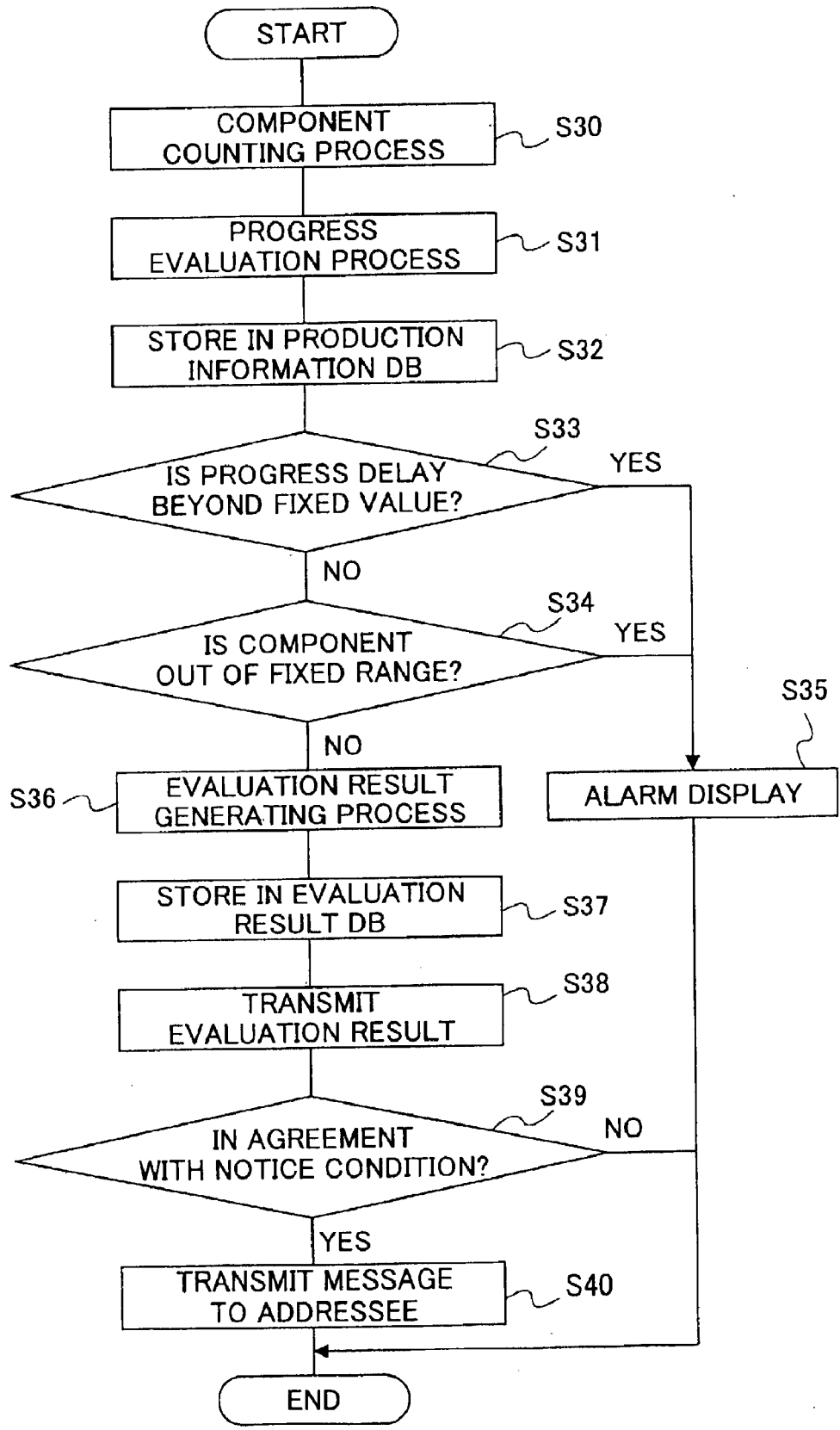
FIG. 4 is a flowchart for explaining the production control process of the first embodiment of the present invention.

Next, the component count processing, the progress evaluation processing, and the evaluation result generation process of the production control processing are explained. FIG. 4 is a flowchart for explaining the production control process of the first embodiment of the present invention. In reference to FIG. 4, at step S30, components of the production information stored in the production information DB 22 are counted by the component counter 25. At step S31, progress evaluation information is generated by the progress evaluation unit 26 based on the component standard information stored in the component standard information DB 21, and the component count information generated at step S30. At step S32, the component count information and the progress evaluation information are stored in the production information DB 22. At step S33, it is determined whether progress delay is beyond a fixed value based on the progress evaluation information. When a progress delay is determined to be in excess of the fixed value at step S33, alarm information is displayed on the management terminal 40a, the terminals 30a through 30n, and the production control server 20 at step S35, such that a warning is issued that there is a progress delay in production.

If the progress delay is determined to be not beyond the fixed value at the step S33, it is determined whether the component of the production information is out of a predetermined range at step S34. If the component of production information is determined to be out of range at the step S34, alarm information is displayed on the management terminal 40a, the terminals 30a through 30n, and the production control server 20 at step S35. If the progress delay is determined to be within the predetermined range at the step S34, the process proceeds to step S36. In step S36, the evaluation result generating unit 27 generates an evaluation result, based on the component standard information stored in the component standard information DB 21 and the production information stored in the production information DB 22. At step S37, the evaluation result is stored in the evaluation result DB 23. At step S38, the evaluation result is transmitted to the management terminal 40a and the production terminals 30a through 30n. At step S39, it is determined whether or not the progress evaluation information is in agreement with the notice condition. When the progress evaluation information does not match with the notice condition at step S39, production control processing ends. When the progress evaluation information is in agreement with the notice condition at the step S39, a prepared message is transmitted, at step S40, to a corresponding developer's terminal.

Figure 5:
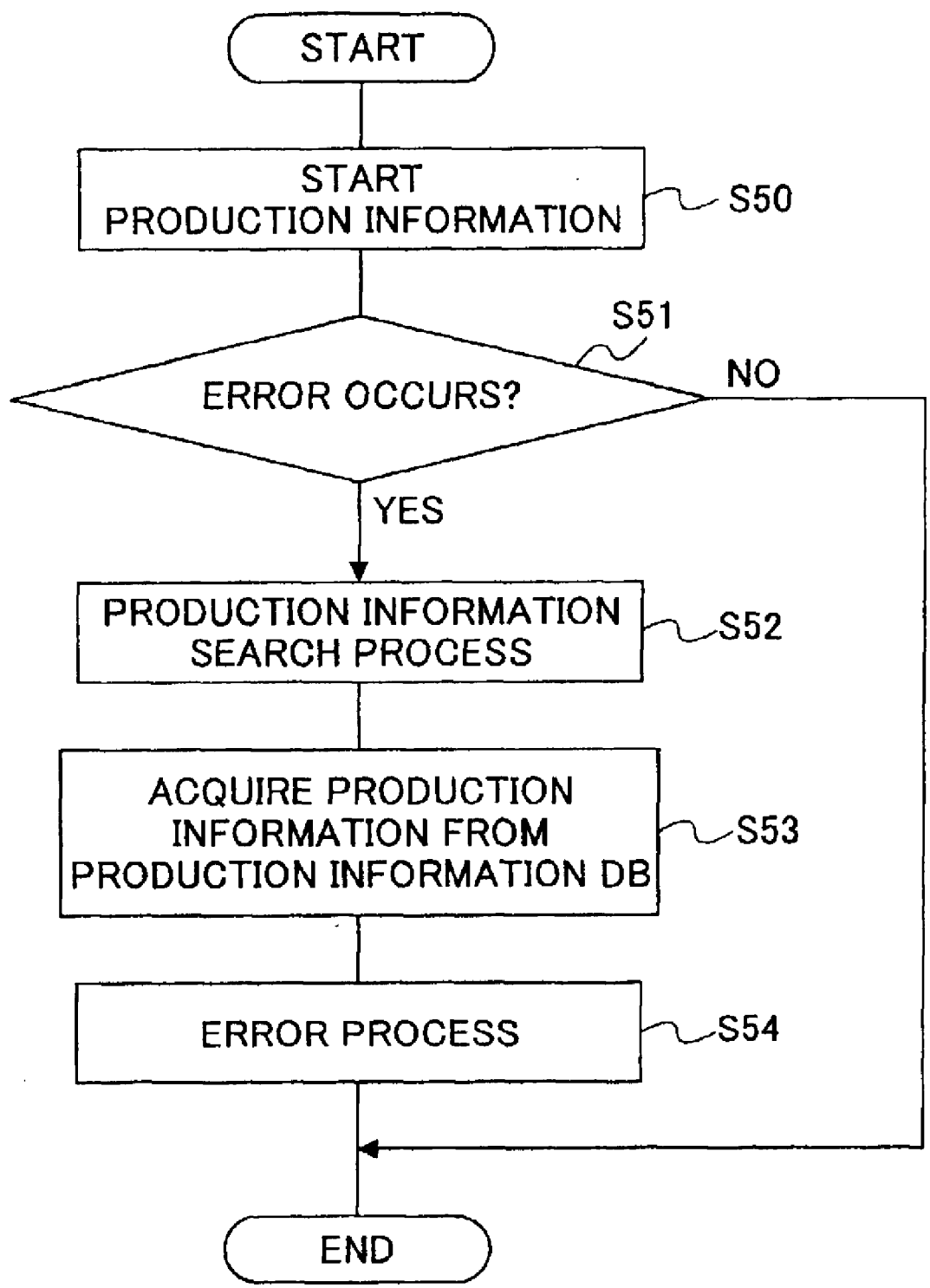
FIG. 5 is a flowchart for explaining the production control process of the first embodiment of the present invention.

Next, the production information search processing that takes place when an error occurs in the production information (a software product) is explained. FIG. 5 is a flowchart for explaining the production control processing of the first embodiment of the present invention. In reference to FIG. 5, at step S50, the production information transmitted from the terminals 30a through 30n is loaded and executed by the production control server 20. At step S51, it is determined whether an error occurred while executing the production information. When no error has occurred in the processing at step S51, the production information search processing ends. When an error has occurred at step S51, the production information DB 22 is searched at step S52, such that the production information that generated the error is identified. At step S53, the identified production information is acquired from the production information DB 22, based on the search result. In order to correct the production information that caused the error, error processing, such as distributing a notice to the production terminals 30a through 30n, is performed at step S54.

FIGS. 6 through 9 show tables stored in the component standard information DB 21 according to the first embodiment of the present invention. The tables 210 through 213 shown in FIGS. 6 through 9, respectively, are transmitted from the production terminals 30a through 30n and the management terminal 40a at step S10 shown in FIG. 2, and stored in the component standard information DB 21. As shown in FIG. 6, the table 210 stores information such as a place name, a company name, a developer name, a development program name, a scheduled size, scheduled productivity, and the number of programs, concerning the developer of a program. For example, in the table 210, the place name is given as "Kawasaki", the company name as "A", the developer name as "Yamada", the development program name as "Screen input", the scheduled size as "4 k" (4,000 steps), scheduled productivity as "2 k/month", the number of programs as "1", and the like.

The table 211 includes, as shown in FIG. 7, a program name, a scheduled starting date, and a scheduled finishing date. For example, "Screen input" program is scheduled to start on 2001.Aug. 1, and to finish by 2001.Sep. 30.

As shown in FIG. 8, the table 212 includes program components, such as a program name, a rate of comment steps against all steps, a rate of execution steps against all steps, a rate of definition steps against all steps, and a rate of function steps against all execution steps. The table 212 shows an example of a "Screen input" program for which the rate of comment steps against all steps is specified as "20%", the rate of execution steps against all steps is specified as "60%", the rate of definition steps against all steps is specified as "20%", and the rate of function steps against all the execution steps is specified as "5%", and the like.

The table 213 in FIG. 9 provides tolerance values (allowance) for each of the above-mentioned rates. Specifically, the example of the table 213 includes, "±10%" for the rate of comment steps against all steps, "±20%" for the rate of execution steps against all steps, "±10%" for the rate of definition steps against all steps, and "±5%" for the rate of function steps against all the execution steps.

Figure 10:
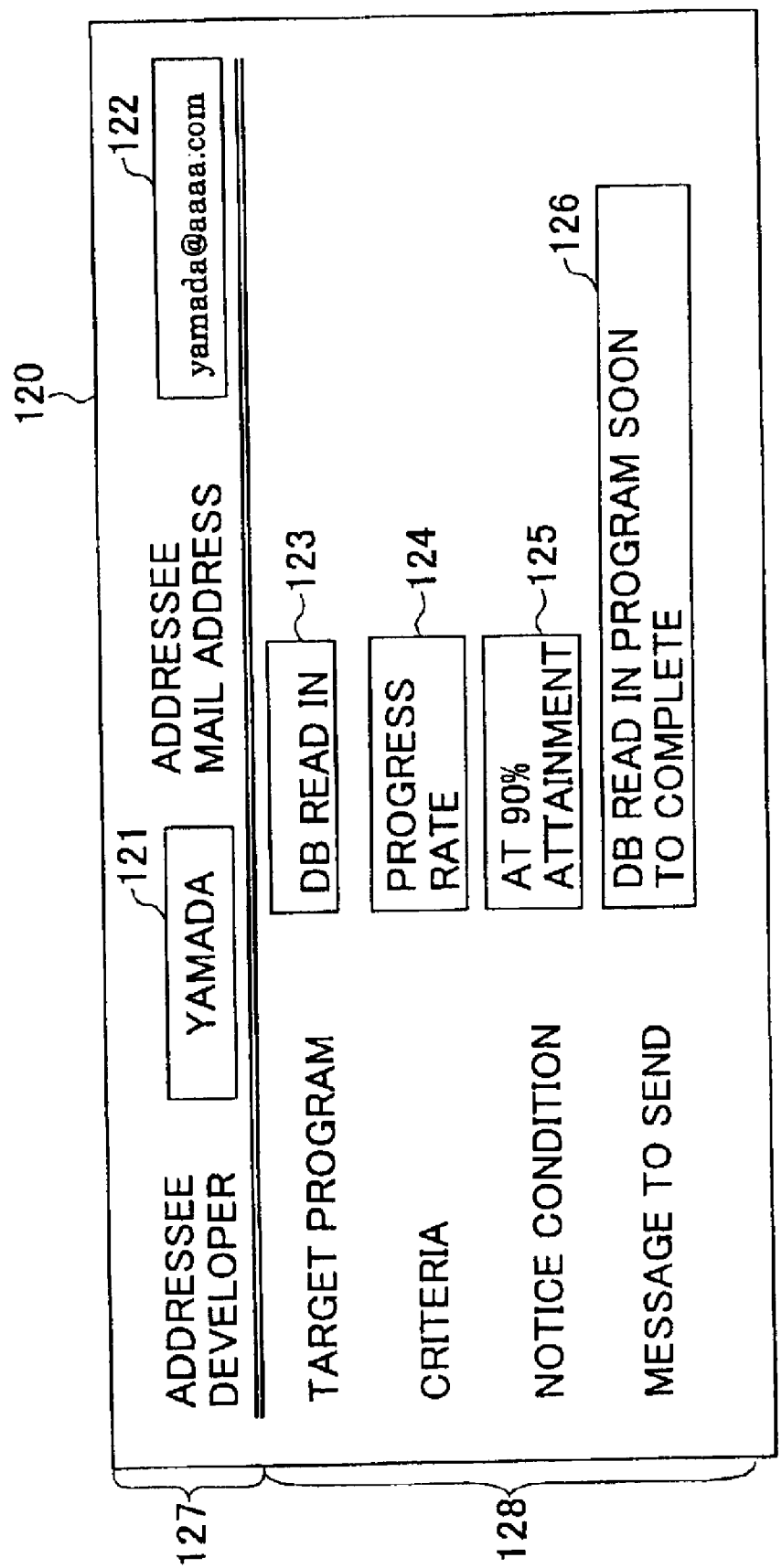
FIG. 10 shows an example of a screen display on which notice conditions are set up in the production control processing of the first embodiment of the present invention.

FIG. 10 shows an example of the notice condition setting screen of the production control processing of the first embodiment of the present invention. The notice condition setting screen 120 as shown in FIG. 10 is displayed on the production terminals 30a through 30n, when setting up a notice condition at the step S12 shown in FIG. 2. This notice condition setting screen 120 includes a display area 127 that sets up an addressee developer, and a display area 128 that sets up a notice condition. The display area 127 includes an input area 121 for inputting a developer's name, and an input area 122 for inputting a mail address of the developer. Further, the display area 128 includes an input area 123 for inputting the name of a program that is the target of the notice, an input area 124 for inputting a checking criterion, an input area 125 for inputting a notice triggering condition, and an input area 126 for inputting a message to be transmitted.

For example, the input area 121 contains "Yamada", the input area 122 contains "yamada@aaaa.com", the input area 123 contains "DB read in", the input area 124 contains "the rate of progress", the input area 125 contains "at the time of 90% attainment", and the input area 126 contains "DB read in program completion soon". When the result of the production control processing of step S39 of FIG. 4 comes into agreement with the notice condition as set up in the above, the message "DB read in program completion soon" is transmitted to "yamada@aaaa.com(Yamada)".

FIG. 11 and FIG. 12 show tables 220 and 221, respectively, stored in the production information DB 22 of the first embodiment of the present invention. The tables 220 and 221 contain production information, and are stored in the production information DB 22 at step S32 shown in FIG. 4. In FIG. 11, the table 220 includes the component count information generated by the component count unit 25, such as the program name, the number of comments, the number of execution steps, the number of data definitions, the number of functions, and the component evaluation. For example, the table 220 indicates two programs. The first program is named "Screen input" wherein the number of comments is "4 k" (4,000 steps), the number of executing steps is "1.3 k" (1,300 steps), the number of data definitions is "0.3 k" (300 steps), the number of functions is "100", and the component evaluation is "OK"; and another program "DB read in" is indicated with the number of comments as "0.3 k" (300 steps), the number of executing steps as "4.7 k" (4,700 steps), the number of data definitions as "1 k" (1,000 steps), the number of functions as "300", and the component evaluation as "NG (meaning No Good) too few comments".

The table 221, shown in FIG. 12, includes the progress evaluation information generated by the progress evaluation unit 26, such as a program name, an actual production starting date, an uploading date, a program size, and the progress evaluation. For example, two programs are indicated in the table 221. The first program name is "Screen input", the actual production starting date is "2001.Sep. 1", the uploading date is "2001.Sep. 30", the program size is "2 k" (2,000 steps), and the progress evaluation is "–4" (a four-week delay); and the second program name is "DB read in", the actual production starting date is "2001.Aug. 1", the upload date is "2001.Sep. 30", the program size is "6 k" (6,000 steps), and the progress evaluation is "+8" (eight weeks in advance).

FIGS. 13 through 15 show tables stored in the evaluation result DB 23 of the first embodiment of the present invention. FIG. 16 shows an example of a screen of the evaluation result of the first embodiment of the present invention. The tables shown in FIGS. 13 through 15, and the example of a screen shown in FIG. 16 are evaluation results generated by the evaluation result generating unit 27 based on the component standard information shown in FIGS. 6 through 9, and the production information shown in FIG. 11 and FIG. 12. As shown in FIG. 13, the table 230 includes a developer's name, the number of programs, a program size, a company name, a progress evaluation average, the number of the delaying programs, and a progress evaluation average of the delaying programs. For example, in the table 230, the developer's name is shown as "Yamada", the number of the programs is given as "1", the program size is indicated as "4 k" (4,000 steps), the company name is given as "A", the progress evaluation average is indicated as "−4" (a four-week delay), the number of the delaying programs is set at "1", and the progress evaluation average of the delaying programs is given as "−4" (a four-week delay); as for a developer "Okawa", the number of programs is "2", the program size is "10 k" (10,000 steps), the company name is "B", the progress evaluation average is "0", the number of the delaying programs is "0", the progress evaluation average of the delaying program is "0"; and as for a developer "Kato", the number of programs is "2", the program size is "5 k" (5,000 steps), the company name is "C", the progress evaluation average is "−2.5" (a 2.5-week delay), the number of the delaying programs is "1", and the progress evaluation average of the delaying programs is "−5" (a five-week delay).

According to the table 230, the developer, Mr. Yamada, is working on a program with a 4-week delay, making the progress evaluation average of −4. The third developer, Mr. Kato, undertakes two programs, one of which is delaying by 5 weeks. With the other program being on time, the progress evaluation average becomes −2.5, that is, −5 divided by the number of the programs that he undertakes, i.e., two.

As shown in FIG. 14, a table 231 is prepared to exhibit situations on a site-by-site basis, and includes a name each site, the number of programs, a program size, the number of developers, a progress evaluation average, the number of programs that are delaying, and a progress evaluation average of the delaying programs. For example, the table 231 exhibits a "Kawasaki" site, among other sites, that is working on "10" programs having a program size of "100 k" (100,000 steps), with "20" developers, where the progress evaluation average is rated at "−0.5" (a half-week delay) with "2" programs delaying, and the progress evaluation average of the delaying programs is rated at "−3" (a three-week delay), etc.

As shown in FIG. 15, a table 232 is prepared to exhibit situations on a company-by-company basis, and includes a company name, the number of programs, a program size, the number of developers, a progress evaluation average, the number of the delaying programs, and a progress evaluation average of the delaying programs. For example, the table 232 shows that a company "A" is loaded with "8" programs of a size of "40 k" (40,000 steps), worked by "4" persons, with a progress evaluation average rated at "1" (one week in advance), with no programs delaying, and therefore the progress evaluation average of the delaying programs is "0", etc.

A screen 233 as shown in FIG. 16 exhibits a result of the component evaluation for each of the developers, and is transmitted to the production terminals 30a through 30n that are used by the developers. The screen 233 includes the name of a developer, the name of a process, an analysis point, a tolerance of DB reading processing, a comment ratio, the number of executing steps, a data definition ratio, a function usage ratio, and alarm contents. For example, the screen 233 indicates that a developer "Okawa" is producing a "DB read in" process, in which comments occupies "5%" (tolerance being 10–30%), the executing step ratio is "78%" (tolerance being 50–90%), the data definition ratio is "17%" (tolerance being 0–20%), a function usage ratio is "5.8%" (tolerance being 5–15%), and the alarm content is "NG too few comments".

Next, a second embodiment of the production control method of the present invention is described. The second embodiment of the present invention performs the production control in the case of producing design specifications instead of developing a program. Since the system configuration and the flowchart of the production control method of the second embodiment are the same as those of FIGS. 1 through 5, descriptions are not repeated.

FIGS. 17 through 20 show tables stored in the component standard information DB 21 of the second embodiment of the present invention. Each of tables 215 through 218 shown in FIGS. 17 through 20, respectively, is transmitted from the production terminals 30a through 30n, and the management terminal 40a, and stored in the component standard information DB 21 at step S10 shown in FIG. 2. As shown in FIG. 17, the table 215 includes a place, a company, a person in charge, a name of design specifications for this place, a scheduled size, and scheduled productivity for this place of the design specifications. For example, in the table 215, "Kawasaki" is set as the place, "A" is set as the company, "Yamada" is set as the person in charge, "Screen input" is the name of the design specifications, "200" (sheets) is set as the scheduled size, and "100" sheets/month is the scheduled productivity.

As shown in FIG. 18, the table 216 stores a design specification name, a scheduled starting date, and a scheduled ending date. For example, the table 216 stores "Screen input" as the design specification name, "2001.Aug. 1" as the scheduled starting date, and "2001.Sep. 30" as the scheduled ending date.

As shown in FIG. 19, the table 217 stores components of the design specifications, such as a size of printing area in terms of the number of characters, an average character ratio over all sheets, a ratio of drawings over all sheets, and a ratio of full-page drawing sheets. For example, the table 217 indicates that a design specification of "Screen input" shall have a printing area equivalent to 800 characters in a sheet, an overall character ratio shall be 50% in average, a drawing ratio shall be 50%, and 10% of the total number of sheets shall be full-page drawings.

As shown in FIG. 20, the table 218 specifies tolerances (allowances) of the average character ratio, the drawing ratio and the ratio of full-page drawings. For example, in the table 218, "±20%" is allowed as to the average character ratio, "±20%" is allowed as to the drawing ratio, and "±10%" is allowed as to the full-page drawings.

Figure 21:
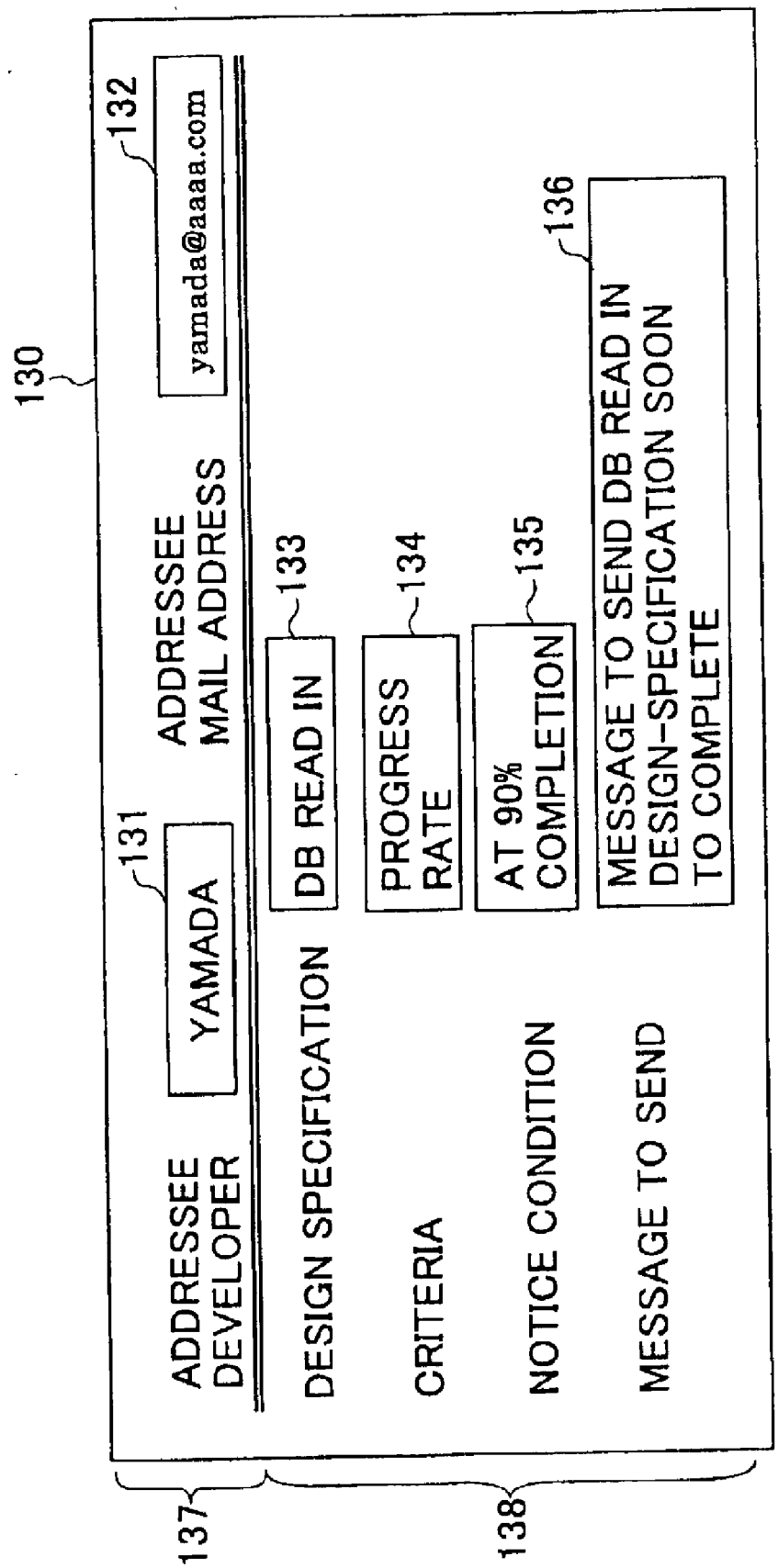
FIG. 21 shows an example of a screen display on which notice conditions are set up in the production control processing of the second embodiment of the present invention.

FIG. 21 shows an example of a notice condition setting screen of the production control processing of the second embodiment of the present invention. As shown in FIG. 21, a notice condition setting screen 130 is displayed on the production terminals 30a through 30n, if the notice condition is to be set up at step S12 shown in FIG. 2. The notice condition setting screen 130 includes a display area 137 that sets up an addressee, and a display area 138 that sets up the notice condition. In the display area 137, an input area 131 is provided for inputting the name of the addressee, and an input area 132 is for inputting the mail address of the addressee. Further, the display area 138 includes an input area 133 for inputting a name of target design specifications, an input area 134 for inputting a checking criterion, an input area 135 for inputting notice condition, and an input area 136 for inputting a message to be transmitted.

For example, the input area 131 contains "Yamada", and the input area 132 contains "yamada@aaaa.com", the input area 133 contains "DB read in", the input area 134 contains "the rate of progress", the input area 135 "at the time of 90% completion", the input area 136 contains "DB read in design-specifications completion soon". When a result of production control processing of step S39 of FIG. 4 is in agreement with the notice condition that is set up, the message, "DB read in design-specifications completion soon" is transmitted to "yamada@aaaa.com(Yamada)".

FIG. 22 and FIG. 23 show tables stored in the production information DB 22 of the second embodiment of the present invention. The tables 225 and 226, shown in FIG. 22 and FIG. 23, respectively, are stored in the production information DB 22 by the step S32 shown in FIG. 4. In the table 225 shown in FIG. 22, the component count information generated by the component counter 25 is stored, such as the name of the design specification, the total number of characters, the number of sheets that contain a drawing, the number of sheets that contain a full-page drawing, and a component evaluation. For example, the table 225 includes "Screen input" as the name of the design specification, the total number of characters is reported as 12,340 characters, the number of sheets containing a drawing is stated as 100, and 20 sheets are reported to contain full-page drawings. The component evaluation is marked by "OK"; and another design specification "DB read in" is indicated such that there are 21,678 characters, 120 sheets that contain a drawing, and 60 sheets that are full-page drawing. The component evaluation of this task is marked as "NG too few drawings".

As shown in FIG. 23, the table 226 includes the progress evaluation information generated by the progress evaluation unit 26, such as a name of design specifications, an actual production starting date, an uploading date, the number of sheets completed, and the progress evaluation. For example, the table 226 shows "Screen input" as the name of the target design specification, the actual production starting date is given as "2001.Sep. 1", the uploading date is shown as "2001.Sep. 30", the number of completed sheets is shown as "100" (sheets), and the progress evaluation is rated at "–4" (a four-week delay); and another design specification "DB read in" is also entered with the actual production starting date "2001.Sep. 1", the uploading date "2001.9.30", the number of completed sheets "300" (sheets), and the progress evaluation "+8" (eight weeks in advance).

FIGS. 24 through 26 show tables stored in the evaluation result DB 23 of the production control server of the second embodiment of the present invention. FIG. 27 shows an example of a screen of the evaluation result of the second embodiment of the present invention. The examples of the tables shown in FIGS. 24 through 26 and the screen shown in FIG. 27 are evaluation results generated by the evaluation result generating unit 27 based on the production information shown in the component standard information shown in FIGS. 17 through 20, FIG. 22, and FIG. 23. As shown in FIG. 24, a table 235 stores an evaluation result generated by the evaluation result generating unit 27, such as a name of a person in charge, the number of design specifications, a scheduled number of sheets of the design specifications, a company name, a progress evaluation average, the number of design specifications that are delaying, and a progress evaluation average of the delayed design specifications. For example, in the table 235, "Yamada" is set as the name of the person in charge, the number of the design specifications is set at "1", the number of sheets of the design specifications is scheduled to be "200", the person in charge belongs to company "A", the progress evaluation average is rated at "–4" (a four-week delay), the number of design specifications that are delaying is "1", the progress evaluation average of the delaying design specifications evaluation is rated at "–4" (a four-week delay); as for a person in charge "Okawa", the number of design specifications is "2", the scheduled number of sheets of the design specifications is "1,000", the developer belongs to company "B", the progress evaluation average is "0", the number of programs that are delaying is "0", the progress evaluation average of delayed design specifications is "0"; and as for a person in charge "Kato", the number of the design specifications is "2", the scheduled number of sheets of the design specifications is "500", the developer belongs to company "C", the progress evaluation average is "–2.5" (a 2.5-week delay), the number of delaying design specifications is "1", and the progress evaluation average of the delaying design specifications is "–5" (a five-week delay).

In this table 235, as for the first person, Yamada, one of a total of one design specification is delaying by four weeks, therefore, the progress evaluation average is (–4), and the progress evaluation average of the delaying design specification is also (–4). As for the third person, Kato, the number of design specifications is two, one of which is delaying by five weeks. The progress evaluation average is (–2.5), since the five-week delay is divided by the number of the design specifications that Kato is loaded, i.e., 2.

FIG. 25 shows a table 236 that stores the progress evaluation on a site-by-site basis, and includes site names, the number of design specifications assigned to each of the sites, the number of scheduled design specification sheets, the number of designers, the progress evaluation average, the number of delaying design specifications, and the progress evaluation average of the delaying design specifications. For example, the table 236 indicates that the "Kawasaki" site is working on 10 design specifications of scheduled volume of 50,000 sheets with 20 designers. The progress evaluation average is rated at "–0.5" (a half-week delay), two design specifications are delaying, the progress evaluation average of the delaying design specifications is rated at "–3" (a three-week delay), and so on.

FIG. 26 shows a table 237 that stores the progress evolution results on a company-by-company basis. The table 237 includes company names, the number of design specifications assigned to each of the companies, the scheduled number of design specification sheets, the number of designers, the progress evaluation average, the number of delaying design specifications, and the progress evaluation average of the delaying design specifications. For example, in the table 237, a company "A" is indicated as working on 8 design specifications of 4,000 sheets with 4 designers. There, the progress evaluation average is "1" (one week in advance), no design specifications are delaying, and the progress evaluation average is "0", and so on.

FIG. 27 shows a screen 234 that indicates the component evaluation result of each of the persons in charge, which is transmitted to the production terminals 30a through 30n. The screen 234 includes the name of a designer, the name of a process, the name of an analyzing point, tolerances of the DB reading process, an average character rate, a rate of drawings, a rate of full-page drawings, and an alarm content. For example, the screen 234 shows that a developer "Okawa" is working on "DB read in" process. The average character rate over all sheets is required to be between 20% and 60% (tolerance), against which an actual rate is "85%". The rate of drawings over all sheets is required to be between 40% and 80%, against which an actual rate is "45%". The rate of full-page drawings is required to be between 10% and 30%, against which an actual rate is "5.8%". Therefore, the contents of the alarm is set as "NG too few drawings".

In this manner, a manager can grasp an exact progress situation by the above-mentioned production control method, in which production information (a software/specification product) developed using the production terminals 30a through 30n is transmitted to the production control server 20, which, then, each component of production information is evaluated based on the transmitted production information. Further, the progress situation can be grasped by selected attributes, for example, on an individual basis, on a site-by-site basis, and on a company-by-company basis.

Further, a developer and a manager can grasp a delay in progress correctly by transmitting the evaluation result to the management terminal 40a, and the production terminals 30a through 30n, based on the evaluation results generated by the component evaluation and the progress evaluation.

Further, progress reports can be transmitted when an evaluation result is in agreement with a predetermined notice condition. In this manner, a developer who develops a program that is related to another program currently being developed at other development sites can obtain an updated progress situation.

Further, since the production information that causes an error can be searched and the production information is acquired from the production information DB 22 of the production control server 20, in the case that an error occurs while the production information (software product) is being executed by the production control server 20, identifying and correcting the production information that causes the error can be performed smoothly and efficiently.

By the present invention, a correct development progress status and other properties of a product can be grasped by evaluating a plurality of components, based on the product.

Further, the progress status can be grasped according to identification and attributes by evaluating the progress situation of products based on predetermined attributes.

Further, an exact progress situation of a product can be grasped by displaying the evaluation result on at least one of the management terminal and the production terminals.

Further, notice conditions can be set up such that when an evaluation result by the component evaluation process or the progress evaluation process is in agreement with the notice conditions, the progress situation of the product is transmitted.

Further, the present invention is not limited to these embodiments, but various variations and modifications may be made without departing from the scope of the present invention.

The present application is based on Japanese priority application No. 2002-053996 filed on Feb. 28, 2002 with the Japanese Patent Office, the entire contents of which are hereby incorporated by reference.

What is claimed is:

1. A production control method that manages development progress of a plurality of products transmitted from a plurality of production terminals of a plurality of developers, said plurality of products being different from each other and being to be integrated into one computer software program after each product having been developed by the respective developers, comprising processes to be practiced by a machine:

a component standard value management process that manages standard values based on a ratio of components of each of the products;

a component evaluation process that evaluates the ratio of components of each product under development based on the standard values thereof; and a progress evaluation process that evaluates a progress situation of the products under development, including a delay in the development.

2. The production control method as claimed in claim 1, further comprising a display process that displays an evaluation result of at least one of the component evaluation process and the progress evaluation process on at least one of the production terminals and a management terminal provided at a central management site.

3. A production control method that manages development progress of a plurality of products transmitted from a plurality of production terminals of a plurality of developers, said plurality of products to be integrated into one final product, comprising:

a component standard value management process that manages standard values of a plurality of components that constitute the products;

a component evaluation process that evaluates the respective development progress of the products by analyzing each of the components of the products, based on the standard values of the components;

a progress evaluation process that evaluates a progress situation of the products by attributes of the components of the products;

a display process that displays an evaluation result of at least one of the component evaluation process and the progress evaluation process on at least one of the production terminals and a management terminal provided at a central management site; and a communication process that transmits a predetermined message to one or more predetermined addresses when the evaluation result of at least one of the component evaluation process and the progress evaluation process matches with a predetermined condition.

4. The production control method as claimed in claim 2, further comprising:

a checking process that determines whether the evaluation result of at least one of the component evaluation process and the progress evaluation process is out of a predetermined range; and an output process that outputs an alarm based on a result of the checking process.

5. The production control method as claimed in claim 1, further comprising:

a search process that searches a product causing an error when the error occurs while executing the plurality of the products; and an error handling process that performs an error process based on a result of the search process.

6. A recording medium storing a computer program that performs a production control method that manages development progress of a plurality of products transmitted from a plurality of production terminals of a plurality of developers, said plurality of products being different from each other and being to be integrated into one computer software program after each product having been developed by the respective developers, comprising processes to be practiced by a machine:

a component standard value management process that manages standard values based on a ratio of components of each of the products;

a component evaluation process that evaluates the ratio of components of each product under development based on the standard values thereof; and a progress evaluation process that evaluates a progress situation of the products under development, including a delay in the development.

7. A production control method that manages development progress of a plurality of products transmitted from a plurality of production terminals of a plurality of developers, said plurality of products to be integrated into one final product, comprising:

a component standard value management process that manages standard values based on a ratio of components of each of the products;

a component evaluation process that evaluates the respective development progress of the products by analyzing each of the components of the products, based on the standard values of the components, wherein the product is a computer software program and the ratio of components is comprised of at least one of a comment ratio, an execution step ratio, a data definition ratio and a function usage ratio.

8. A production control method comprising processes to be practiced by a machine:

managing standard values based on a ratio of components of products;

evaluating the ratio of the components of each product under development, based on standard values of the components; and evaluating a progress situation of the products under development, including a delay in the development.

9. The production control method as claimed in claim 8, further comprising displaying an evaluation development result and a progress evaluation result of at least one of the components.

10. A production control method comprising:

managing standard values of a plurality of components that constitute a plurality of products to be integrated into one final product;

evaluating the development progress of the plurality of products by analyzing each of the components of the plurality of products, based on the standard values of the components;

evaluating a progress situation of the plurality of products by attributes of the components;

displaying an evaluation development result and a progress evaluation result of at least one of the components; and transmitting a predetermined message to one or more predetermined addresses when the evaluation development result and the progress evaluation result match a predetermined condition.

11. The production control method as claimed in claim 9, further comprising:

determining whether the progress evaluation result of at least one of the components and the progress evaluation result is out of a predetermined range; and outputting an alarm based on a result of the checking process.

12. The production control method as claimed in claim 8, further comprising:

searching for a product causing an error when the error occurs while executing the plurality of the products; and performing an error correction based on a result of the searching.

13. A recording medium storing a computer program performing a production control method, the method comprising:

a component standard value management process that manages standard values based on a ratio of components of each of products, said products to be integrated into one final product; and a component evaluation process that evaluates the ratio of components of each product under development based on the standard values thereof.

14. An apparatus comprising:

means for managing standard values based on a ratio of components of each of the products, said products to be integrated into one final product; and means for evaluating the ratio of components of each product under development based on the standard values thereof, wherein the final product is a computer software program and the ratio of components is comprised of at least one of a comment ratio, an execution step ratio, a data definition ratio and a function usage ratio.

15. The recording medium of claim 13, further comprising a progress evaluation process that evaluates a progress situation of the products by attributes of the components of the products.

16. The apparatus according to claim 14, further comprising means for evaluating a progress situation of the products by attributes of the components of the products.

* * * * *